(12) United States Patent
Hahn

(10) Patent No.: US 11,727,190 B1
(45) Date of Patent: Aug. 15, 2023

(54) PREVIEWS FOR COLLABORATIVE DOCUMENTS

(71) Applicant: Salesforce, Inc., San Francisco, CA (US)

(72) Inventor: Michael Hahn, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/589,584

(22) Filed: Jan. 31, 2022

(51) Int. Cl.
G06F 40/00 (2020.01)
G06F 40/106 (2020.01)
H04L 65/401 (2022.01)

(52) U.S. Cl.
CPC ........ *G06F 40/106* (2020.01); *H04L 65/4015* (2013.01)

(58) Field of Classification Search
CPC ............................ G06F 40/106; H04L 65/4015
See application file for complete search history.

(56) References Cited

U.S. PATENT DOCUMENTS

| | | | |
|---|---|---|---|
| 6,008,804 A | 12/1999 | Pommier et al. | |
| 7,913,178 B2 | 3/2011 | Gould et al. | |
| 8,924,844 B2 | 12/2014 | Lynch | |
| 10,848,445 B1 | 11/2020 | Willmann | |
| 11,256,387 B1 * | 2/2022 | Huff | G06F 16/958 |
| 11,301,200 B2 | 4/2022 | Zhang et al. | |
| 11,374,990 B2 | 6/2022 | Lansing et al. | |
| 2004/0267871 A1 | 12/2004 | Pratley et al. | |
| 2005/0132281 A1 | 6/2005 | Pan et al. | |
| 2005/0193325 A1 | 9/2005 | Epstein | |
| 2008/0183819 A1 | 7/2008 | Gould et al. | |
| 2008/0229185 A1 | 9/2008 | Lynch | |
| 2009/0157811 A1 | 6/2009 | Bailor et al. | |
| 2009/0271696 A1 | 10/2009 | Bailor et al. | |
| 2013/0080919 A1 | 3/2013 | Kiang et al. | |
| 2013/0174032 A1 * | 7/2013 | Tse | G06F 40/106 |
| | | | 715/273 |
| 2014/0258972 A1 | 9/2014 | Savage et al. | |
| 2016/0315995 A1 | 10/2016 | Hausler et al. | |
| 2017/0063749 A1 | 3/2017 | Gupta et al. | |

(Continued)

OTHER PUBLICATIONS

U.S. Appl. No. 17/564,506, Non-Final Office Action dated Oct. 6, 2022.

(Continued)

*Primary Examiner* — Scott T Baderman
*Assistant Examiner* — Barbara M Level
(74) *Attorney, Agent, or Firm* — Erise IP, P.A.

(57) ABSTRACT

Media, methods, and systems for causing display on a client device of a preview of a collaborative document in a group-based communication system based on user-specific indicia, content-specific data, changed document data that thereby presents a dynamic preview, or a combination of user-specific indicia, content-specific data, and changed document data. Media, methods, and systems further provide a container for files may be created within a group-based communication system. Once files are received and associated with the container, a container preview may be generated. After creation, the container preview may be transmitted to users of the group-based communication system for display.

20 Claims, 13 Drawing Sheets

(56) References Cited

U.S. PATENT DOCUMENTS

| | | | |
|---|---|---|---|
| 2017/0132200 A1 | 5/2017 | Noland et al. | |
| 2018/0157390 A1 | 6/2018 | Vas et al. | |
| 2018/0287982 A1 | 10/2018 | Draeger et al. | |
| 2019/0058680 A1 | 2/2019 | Rosania et al. | |
| 2019/0098087 A1 | 3/2019 | Johnston et al. | |
| 2019/0102472 A1* | 4/2019 | Van Rensburg | G06Q 10/101 |
| 2019/0108241 A1* | 4/2019 | Emerick | G06F 16/1734 |
| 2019/0166330 A1 | 5/2019 | Ma et al. | |
| 2019/0179876 A1* | 6/2019 | Zhang | G06F 40/169 |
| 2019/0253430 A1 | 8/2019 | Gamache et al. | |
| 2019/0325213 A1 | 10/2019 | Numata | |
| 2020/0090135 A1 | 3/2020 | Malcangio et al. | |
| 2020/0279070 A1* | 9/2020 | Rose | G06F 40/226 |
| 2020/0348802 A1 | 11/2020 | Brito et al. | |
| 2020/0387567 A1 | 12/2020 | Loforte et al. | |
| 2021/0150480 A1 | 5/2021 | Haramati et al. | |
| 2021/0248556 A1 | 8/2021 | Venkatraman et al. | |
| 2021/0397402 A1 | 12/2021 | Ashkenazi et al. | |
| 2022/0078143 A1 | 3/2022 | Eirinberg et al. | |
| 2022/0086200 A1 | 3/2022 | Lansing et al. | |
| 2022/0222625 A1 | 7/2022 | Haramati et al. | |
| 2022/0365740 A1 | 11/2022 | Chang et al. | |

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—a New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.eom/#/stewart-butterfield-the-big-pivot/, (dated Jan. 17, 2018) 27 pages.

Hu, Vincent C. et al.; Attribute Considerations for Access Control Systems; NIST Special Publication 800-205; U.S. Department of Commerce; pp. 1-42; https://doi.org/10.6028/NIST.SP.800-205; retrieved on Aug. 24, 2022.

U.S. Appl. No. 17/566,947, Non-final Office Action dated Apr. 24, 2023.

U.S. Appl. No. 17/589,822, Final Office Action dated Mar. 23, 2023.

United States Patent and Trademark Office, U.S. Appl. No. 17/589,692, Non-Final Office Action dated Jan. 18, 2023.

Malik et al. A Comparison of Collaborative Access Control Models, IJACSA 8:3, 2017, pp. 209-206. (2017).

United States Patent and Trademark Office, U.S. Appl. No. 17/589,822, Non-Final Office Action dated Nov. 30, 2022.

U.S. Appl. No. 17/564,506, Final Office Action dated Feb. 3, 2023.

U.S. Appl. No. 17/589,692, Non-Final Office Action dated Jan. 18, 2023.

PCT Patent Application PCT/US2022/052680 International Search Report and Written Opinion of the International Search Report, dated Apr. 5, 2023.

* cited by examiner

Marketing in a Virtual Environment

Executive Summary

Acme's push to market in a virtual environment is proceeding well! We have seen tremendous growth and look forward to the upcoming year.

Marketing Proposals

Invest in continued usage of Slack and encourage ongoing education by team members and usage with customers.

Marketing Leads
- Northwest Territory – Hardware Supplies, Inc.
- Southeast Territory – Reynolds Machines, LLC Page 1

Marketing Expenses

Our marketing expenses are anticipated to be lower than last year. We are investing in platforms that encourage virtual interaction with our clients and worldwide team members.

@B_Goodman – Please provide marketing expenses for last fiscal year. Note this information is confidential!

Page 2

FIG. 3B

Marketing in a Virtual Environment

<u>Executive Summary</u>
  Acme's push to market in a virtual environment is proceeding well! We have seen tremendous growth and look forward to the upcoming year.

<u>Marketing Proposals</u>
  Invest in continued usage of Slack and encourage ongoing education by team members and usage with customers.

<u>Marketing Leads</u>
- Northwest Territory – Hardware Supplies, Inc.
- Southeast Territory – Reynolds Machines, LLC <u>Marketing Expenses</u>
  Our marketing expenses are anticipated to be lower than last year. We are investing in platforms that encourage virtual interaction with our clients and worldwide team members.

VERSION 1

---

Marketing in a Virtual Environment

<u>Goals for ACME Marketing</u>
  Acme's push to market in a virtual environment is proceeding well! We have seen tremendous growth and look forward to the upcoming year.
  @C_Simon Please input additional top-level summary points we discussed.

<u>Marketing Proposals</u>
- Invest in continued usage of Slack and encourage ongoing education by team members and usage with customers.
- Set weekly status updates with customers.
- Highlight home office remodels for virtual working.

<u>Marketing Leads</u>
- Global – Consider expansion to UK
- Northwest Territory – Hardware Supplies, Inc.
- Southeast Territory – Reynolds Machines, LLC <u>Marketing Expenses</u>
  Our marketing expenses are anticipated to be lower than last year. We are investing in platforms that encourage virtual interaction with our clients and worldwide team members. To Be Completed By @B_Goodman

VERSION 2

FIG. 4B

USER INTERFACE FOR FIRST USER
AT SECOND TEMPORAL INSTANCE
— 400a

Acme ▶

Threads
All DMs
Mentions
▶ Channels
general
social
Marketing
  🗎 Marketing To-Do List — 452
▼ DMs
  B. Goodman
  C. Simon
  J. Smith, C. Simon 🔍 Search

Marketing

Marketing To-Do List  Documents

👤 J. Smith 9:30am
Here is the marketing summary for Acme. LMK what you think.
Document ▶
🗎 Acme Marketing Summary.docx
   Document

[ Preview | Revised ] — 460

<u>454</u>

Marketing in a Virtual Environment — 448

Goals for ACME Marketing
Acme's push to market in a virtual environment is proceeding well! We have seen tremendous growth and look forward to the upcoming year.
@C_Simon Please input additional top-level summary points we discussed.

Marketing Proposals — 450b
 • Invest in continued usage of Slack and encourage ongoing education by team members and usage with customers.
 • Set weekly status updates with customers.
 • Highlight home office remodels for virtual working.

👤 B. Goodman 9:35am
Thx @J_Smith for forwarding. I will revise and let you know when complete.

👤 B. Goodman 10:30am
I just finished the revisions to the marketing summary, which should now be viewable.

Message #Marketing
B I S | ∂ | ✦ | ≔ ≔ | ❞
⊕ | 📎 😊 @ Aa                           ▲▶

🎤 Marketing

FIG. 4C

PREVIEWS FOR COLLABORATIVE DOCUMENTS

TECHNICAL FIELD

Embodiments of the invention relate to generating a preview for collaborative documents within a group-based communication system. More specifically, embodiments of the invention relate to generating a preview based on user-specific indicia relevant to a user receiving the preview or a change in the document data. Other embodiments of the invention relate to generating a preview for a container of documents within a group-based communication system based in part on the content of the documents and the types of documents.

Document previews rendered on a client device's display are often either unhelpful or require time investments to make them useful. Many document previews are generated based on whatever content is at the start of the document, which may not provide a good summary. Oftentimes hosted documents will need to be downloaded and opened locally to determine the contents, particularly for groups of documents. Alternatively, users can create their own document previews, but this requires time and effort. Existing solutions are also focused on providing previews for individual documents and are unable to generate document previews for collections of documents. As such, there is a need for a preview which can allow users to quickly understand a summary of one or more documents.

SUMMARY

Embodiments of the invention address the above-identified problems by providing media, methods, and systems for generating improved collaborative document previews for users of group-based communication systems. The collaborative document allows for viewing and editing by multiple persons. In embodiments, the collaborative document may be associated with user-specific indicia, such as permissions for a user relative to the collaborative document or one or more sections of the collaborative document. Embodiments of the invention contemplate a preview of the document in a user's user interface that is (1) based on user-specific indicia; (2) based on content-specific data; (3) based on changed document data and thereby presenting a dynamic preview; or (4) a combination of user-specific indicia, content-specific data, and changed document data.

In a first embodiment, the invention includes one or more non-transitory computer-readable media storing computer-executable instructions that, when executed by a processor, perform a method for identifying at least one collaborative document posted in the group-based communication system by a first user in a first user interface; causing display of a first preview of the at least one collaborative document to the first user in the first user interface; and causing display of a second preview of the at least one collaborative document to a second user in a second user interface. In the first embodiment, the second preview of the at least one collaborative document is based on user-specific indicia of the at least one collaborative document, wherein the user-specific indicia are specific to the second user, such that the second preview caused to be displayed to the second user is distinct, at least in part, to the first preview caused to be displayed to the first user. Alternatively in the first embodiment, the second preview of the at least one collaborative document is based on changed data of the collaborative document, such that the second preview caused to be displayed to the second user dynamically changes in response to the changed data of the collaborative document. In yet a further alternative of the first embodiment, the second preview of the at least one collaborative document is based on both the user-specific indicia and the changed data of the collaborative document.

In a second embodiment, the invention includes a method for identifying at least one collaborative document posted in the group-based communication system by a first user in a first user interface; causing display of a first preview of the at least one collaborative document to the first user in the first user interface; and causing display of a second preview of the at least one collaborative document to a second user in a second user interface. In the second embodiment, the second preview of the at least one collaborative document is based on user-specific indicia of the at least one collaborative document, wherein the user-specific indicia are specific to the second user, such that the second preview caused to be displayed to the second user is distinct, at least in part, to the first preview caused to be displayed to the first user. Alternatively in the second embodiment, the second preview of the at least one collaborative document is based on changed data of the collaborative document, such that the second preview caused to be displayed to the second user dynamically changes in response to the changed data of the collaborative document. In yet a further alternative of the second embodiment, the second preview of the at least one collaborative document is based on both the user-specific indicia and the changed data of the collaborative document.

In a third embodiment, the invention includes a system comprising at least one processor and at least one non-transitory memory storing computer executable instructions that when executed by the at least one processor cause the system to carry out actions for identifying at least one collaborative document posted in the group-based communication system by a first user in a first user interface; causing display of a first preview of the at least one collaborative document to the first user in the first user interface; and causing display of a second preview of the at least one collaborative document to a second user in a second user interface. In the third embodiment, the second preview of the at least one collaborative document is based on user-specific indicia of the at least one collaborative document, wherein the user-specific indicia are specific to the second user, such that the second preview caused to be displayed to the second user is distinct, at least in part, to the first preview caused to be displayed to the first user. Alternatively in the third embodiment, the second preview of the at least one collaborative document is based on changed data of the collaborative document, such that the second preview caused to be displayed to the second user dynamically changes in response to the changed data of the collaborative document. In yet a further alternative of the third embodiment, the second preview of the at least one collaborative document is based on both the user-specific indicia and the changed data of the collaborative document.

Fourth through sixth embodiments of the invention relate to causing display of a preview of two or more collaborative documents. In these embodiments, users can group multiple documents into containers and automatically generate previews for the entire container of documents. These container previews correspond to the documents within the container and allow for users of the group-based communication system to quickly understand the contents of the container without requiring those users to download either the containers or the individual documents. The container previews can be different types, such as documents, images, or videos, based on the file types of the documents in the corresponding container.

A fourth embodiment of the invention includes one or more non-transitory computer-readable media storing computer-executable instructions that, when executed by a processor, perform a method for displaying a preview of a plurality of files in a group-based communication system, the method comprising receiving a first request from a first user of the group-based communication system to create a container, wherein the container is configured to group the plurality of files, receiving the plurality of files and associating each of the plurality of files with the container, receiving a request from a second user of the group-based communication system to view a container preview, generating the container preview based on a preview type, wherein the container preview corresponds to information from two or more of the plurality of files and wherein the preview type corresponds to a file type of one or more of the plurality of files, and transmitting the container preview for display to the second user.

In a fifth embodiment, the invention includes a method for displaying a preview of a plurality of files in a group-based communication system, the method comprising receiving a first request from a first user of the group-based communication system to create a container, wherein the container is configured to group the plurality of files, receiving the plurality of files and associating each of the plurality of files with the container, receiving a request from a second user of the group-based communication system to view a container preview, generating the container preview based on a preview type, wherein the container preview corresponds to information from two or more of the plurality of files and wherein the preview type corresponds to a file type of one or more of the plurality of files, and transmitting the container preview for display to the second user.

In a sixth embodiment, the invention includes a system comprising at least one processor and at least one non-transitory memory storing computer executable instructions that when executed by the at least one processor cause the system to carry out actions for displaying a preview of a plurality of files in a group-based communication system comprising receiving a first request from a first user of the group-based communication system to create a container, wherein the container is configured to group the plurality of files, receiving the plurality of files and associating each of the plurality of files with the container, receiving a request from a second user of the group-based communication system to view a container preview, generating the container preview based on a preview type, wherein the container preview corresponds to information from two or more of the plurality of files and wherein the preview type corresponds to a file type of one or more of the plurality of files, and transmitting the container preview for display to the second user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 3B illustrates the collaborative document previewed in FIG. 3A;

FIG. 4B illustrates a first version and an updated second version of the collaborative document previewed in FIG. 4A;

FIG. 4C depicts a user interface illustrating an updated preview of the collaborative document of FIGS. 4A-4B on the first user interface of FIG. 4A;

Figure 1A:
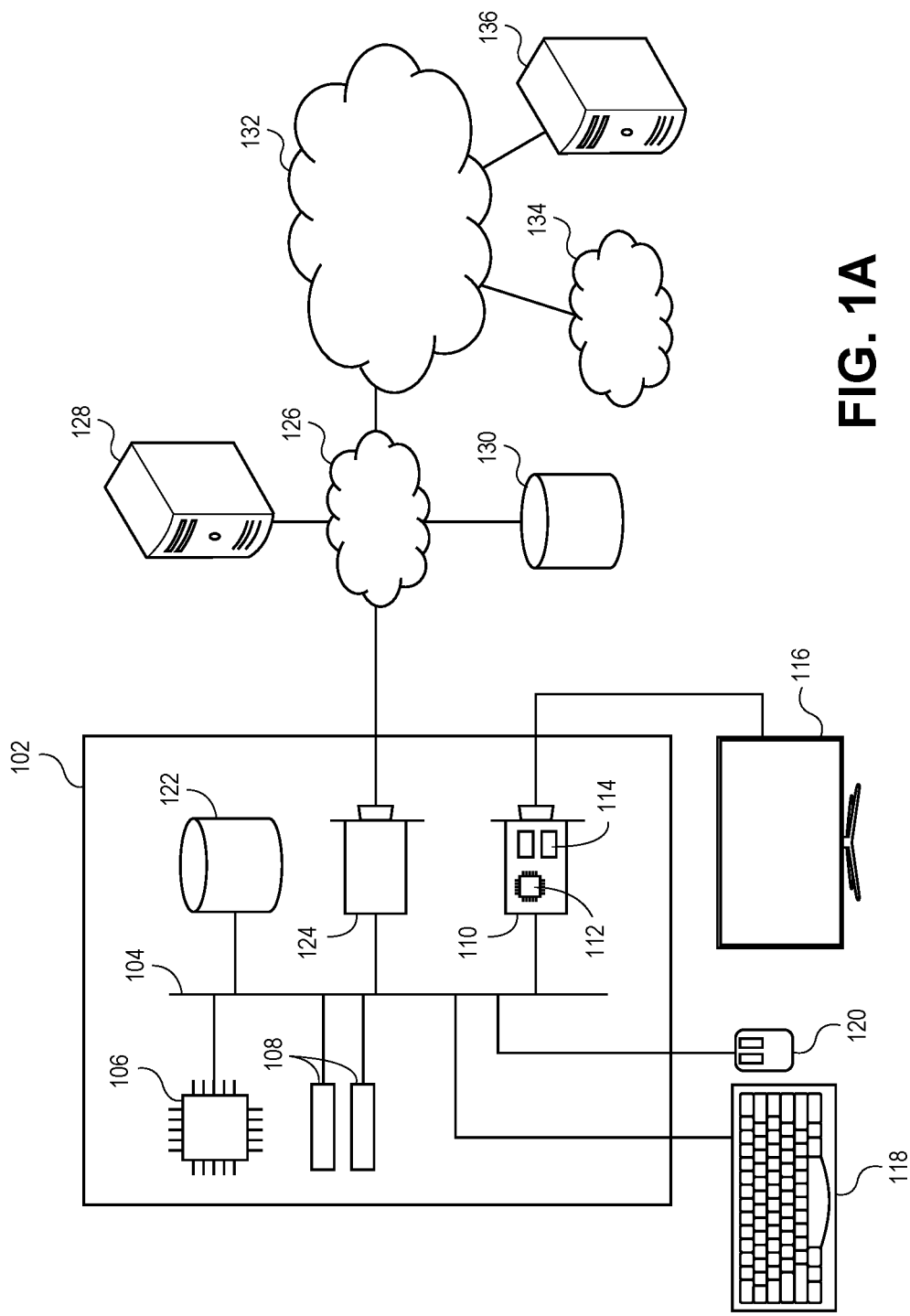
FIG. 1A depicts an exemplary hardware platform relating to certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email system. In some embodiments, the group-based communication system is a channel-based platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each project can converse without bothering (or being bothered by) developers working on other projects. Because the channels are generally persistent and directed to a particular topic or group, users can quickly and easily refer to previous communications for reference.

In some embodiments, the group-based communication system may include synchronous multimedia collaboration sessions. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, or a set of users, while in other embodiments, synchronous multimedia collaboration sessions may exist without being tied to any particular channel, topic, or set of users. Synchronous multimedia collaboration sessions may be short, ephemeral sessions from which no data is persisted. Alternatively, in some embodiments, synchronous multimedia collaboration sessions may be recorded, transcribed, and/or summarized for later review. Members of a particular synchronous multimedia collaboration session can post messages within a messaging thread associated with that synchronous multimedia collaboration session that are visible to other members of that synchronous multimedia collaboration session together with other messages in that thread. The "multimedia" in a synchronous multimedia collaboration session may include any or all of audio, video, screen sharing, collaborative document editing, whiteboarding, co-programming or any other form of media. A synchronous multimedia collaboration session may be started for a particular channel or direct message conversation by one or more members of that channel or direct message conversation. For example, a user may start a synchronous multimedia collaboration session in a channel as a means of communicating with other members of that channel who are presently online. The user may have an urgent decision and want immediate verbal feedback from other members of the channel. Starting a synchronous multimedia collaboration session allows the user to start an immediate audio conversation with other members of the channel without requiring scheduling.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses, or components may communicate with each other directly. Central processing unit (CPU) 106 is connected to system bus 104. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functionality for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
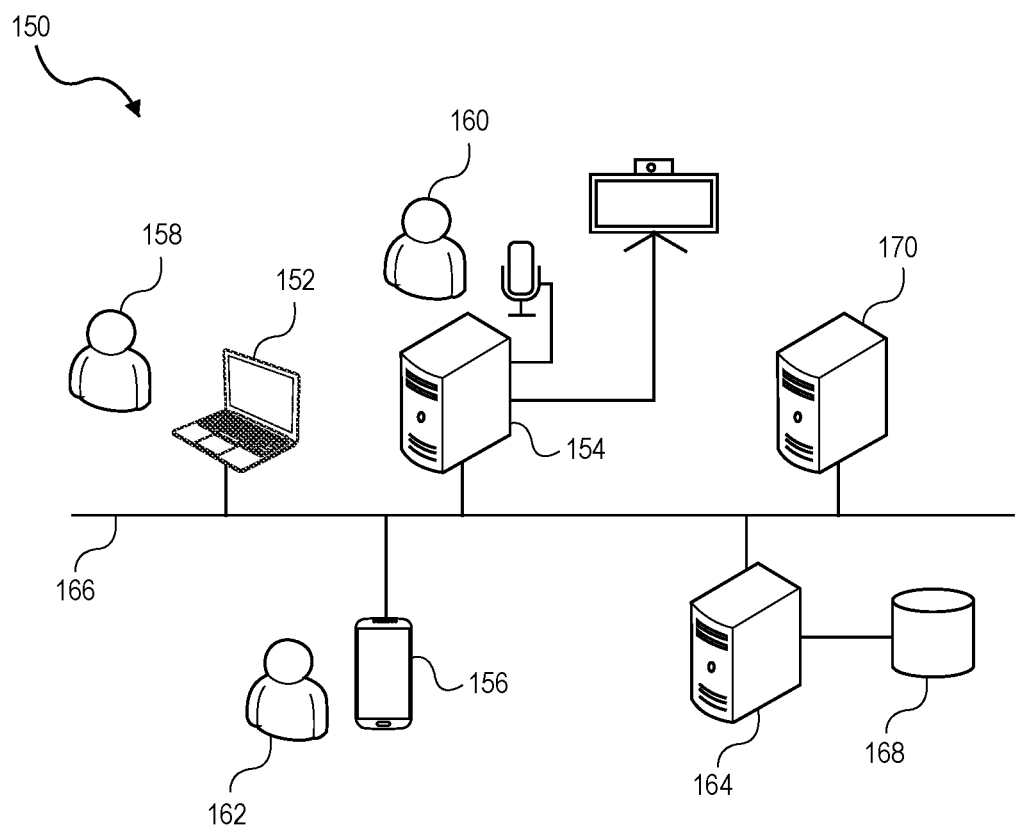
FIG. 1B depicts a system including elements for carrying out certain embodiments of the invention.

FIG. 1B illustrates elements of a system 150 for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Group-based communication system server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, collaboration sessions may be archived and stored on the group-based communication system data store 168 for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively, or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server 170 is via network 166. In some embodiments, however, the real-time nature of collaboration sessions may be better served by connecting via a different network for part or all of the communicative coupling. For example, a particular client device may normally connect to group-based communication system server 164 via a cellular data connection but switch to a Wi-Fi connection when a multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

User Interface

Figure 2A:
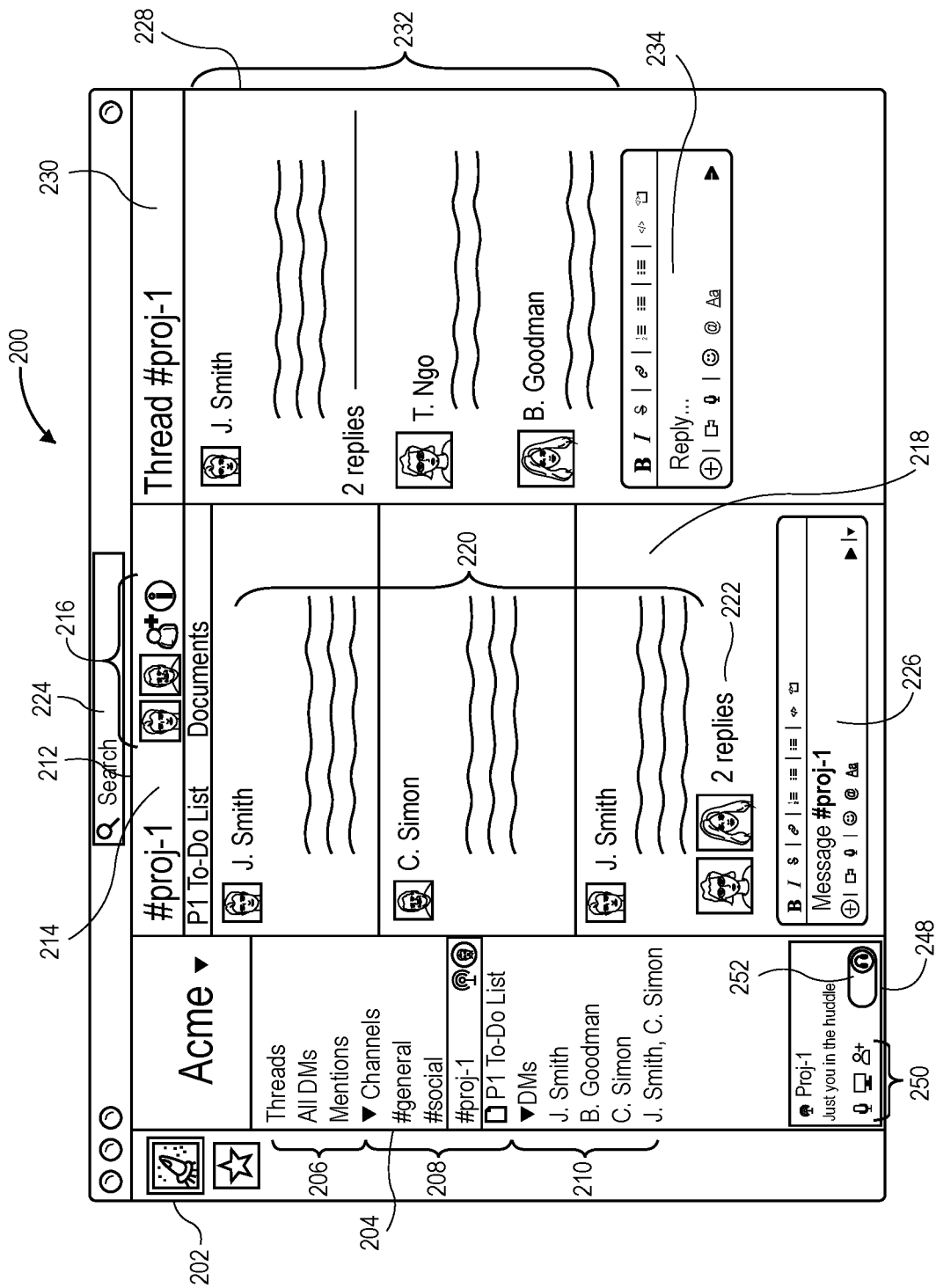
FIG. 2A illustrates a user interface for the group-based communication system for certain embodiments.

FIG. 2A illustrates a user interface 200 of a group-based communication system, which will be useful in illustrating the operation of various embodiments, as discussed in further detail below. Broadly, user interface 200 comprises a plurality of objects such as panes, text entry fields, buttons, messages, or other user interface components. As depicted, user interface 200 comprises workspace pane 202; channel list pane 204, which comprises quick info list 206, channel and document list 208, and direct message list 210; channel pane 212, which comprises channel header 214, channel controls 216, channel display 218, messages 220, and thread reply preview 222; search pane 224; compose pane 226; and thread pane 228.

As depicted, user interface 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Engineering. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme Software Engineering projects, a workspace for Human Resources, and an additional workspace for general company matters. In some embodiments, workspaces can be associated with one or more organizations or other entities associated with the group-based communication system.

Users may navigate between channels using channel list pane 204. Channel list pane 204 may comprise quick info list 206 comprising various links for a user to quickly access portions of the group-based communication system. For example, as depicted, quick info list 206 comprises threads, Direct Messages (DMs), and mentions/reactions. Each of the items in quick info list 206 may be bolded, italicized, highlighted, boxed, animated, or otherwise called out to indicate the presence of unread items or items otherwise of interest. Clicking on the threads link in quick info list 206 may cause the display of all threads in which the user has participated, while clicking on the DMs list may cause the display in user interface 200 of all the direct messages in which the user is involved. Quick info list 206 may be configurable by the user to add various links to areas of the group-based communication system for quick access, such as a link to view all files shared within the group-based communication system. Channel list pane 204 may also comprise channel and document list 208 listing all channels and documents to which the user has subscribed to or to which the user has been granted access. In some embodiments, channel list pane 204 further includes direct message list 210. Direct message list 210 comprises a list of messages sent from a user directly to another user of the group-based communication system, which may be displayed in channel pane 212 when selected. Direct messages may be sent to one other user or to any number of users. In some embodiments, channel list pane 204 may include synchronous multimedia collaboration session pane 248. Synchronous multimedia collaboration session pane 248 may comprise synchronous multimedia collaboration session controls 250 and synchronous multimedia collaboration session toggle 252. In some embodiments, synchronous multimedia collaboration session pane 248 may display information on which users are participating in a synchronous multimedia collaboration session. Synchronous multimedia collaboration session controls 250 allow a user to mute or unmute, share a screen, and invite other users into the synchronous multimedia collaboration session. In some embodiments, a user selecting to mute during a synchronous multimedia collaboration session may provide the user with an option of providing background music. Users can leave or join a synchronous multimedia collaboration session by actuating synchronous multimedia collaboration session toggle 252. In some embodiments, the synchronous multimedia collaboration session will correspond to a channel or message that the user selected within channel list pane 204.

User interface 200 may further comprise channel pane 212 that displays information related to the currently displayed channel. In some embodiments, within the group-based communication system, communication may be organized into "channels," each channel dedicated to a particular topic or set of users. For example, Acme Software Engineering company utilizing the group-based communication system may have a channel #general to discuss general company matters and a #proj-1 channel to discuss a live project. Teams within the software engineering firm may have their own channels as well, such as a #devops channel for a DevOps team. Members of a particular channel can post messages within that channel that are visible to other members of that channel together with other messages in that channel. In some embodiments, or for certain selected channels, messages may be visible only to channel members; in other embodiments or for other channels, non-members of a channel may be able to preview messages in a channel without joining. Users may select a channel for viewing to see only those messages relevant to the topic of that channel without seeing messages posted in other channels on different topics.

Channel pane 212 may also include channel header 214, which may display metadata for the currently selected channel, including channel name, channel membership, and channel topic. Channel header 214 may also display channel controls 216 for viewing members of the channel, inviting a new member to the channel, viewing information about the channel, or other channel-related functions. User interface 200 may also include search pane 224. Search pane 224 may allow users to search for content located in the current workspace of the group-based communication system, such as files, messages, channels, members, commands, functions, and the like.

As previously mentioned, channel pane 212 may also include compose pane 226. Compose pane 226 allows users to compose and transmit messages to the members of the channel. Compose pane 226 may have text editing functions such as bold, strikethrough, and italicize. Compose pane 226 may also allow users to format their messages or attach files such as, but not limited to, document files, images, videos, or any other files to share the file or files with other members of the channel.

In some embodiments, conversations in channels may further be broken out into threads. Threads may be used to aggregate messages related to a particular conversation together to make the conversation easier to follow and reply to. For example, a user, J. Smith, in the channel #proj-1 may ask a question pertaining to a specific company policy. Another member of the channel may decide to reply to J. Smith in a thread to keep the conversation grouped together and to keep the response from getting lost in the channel. Under the message to which a user has replied appears thread reply preview 222. Thread reply preview 222 may show information related to the thread, such as, for example, the number of replies and the members who have replied. Thread replies may appear in thread pane 228 that may be separate from channel display 218 in channel pane 212 and may be viewed by other members of the channel by selecting thread reply preview 222 in channel display 218.

In some embodiments, thread pane 228 comprises thread header 230 that may display the channel the thread is associated with. Thread pane 228 also may include scrollable thread display 232 that displays each message sent in the history of the thread. Users participating in the thread may also reply directly to the thread using thread compose pane 234. Thread compose pane 234 may be positioned within thread pane 228 where a user can compose and transmit a reply to the messages in the thread. In some embodiments, thread compose pane 234 shares the features of compose pane 226.

Figure 2B:
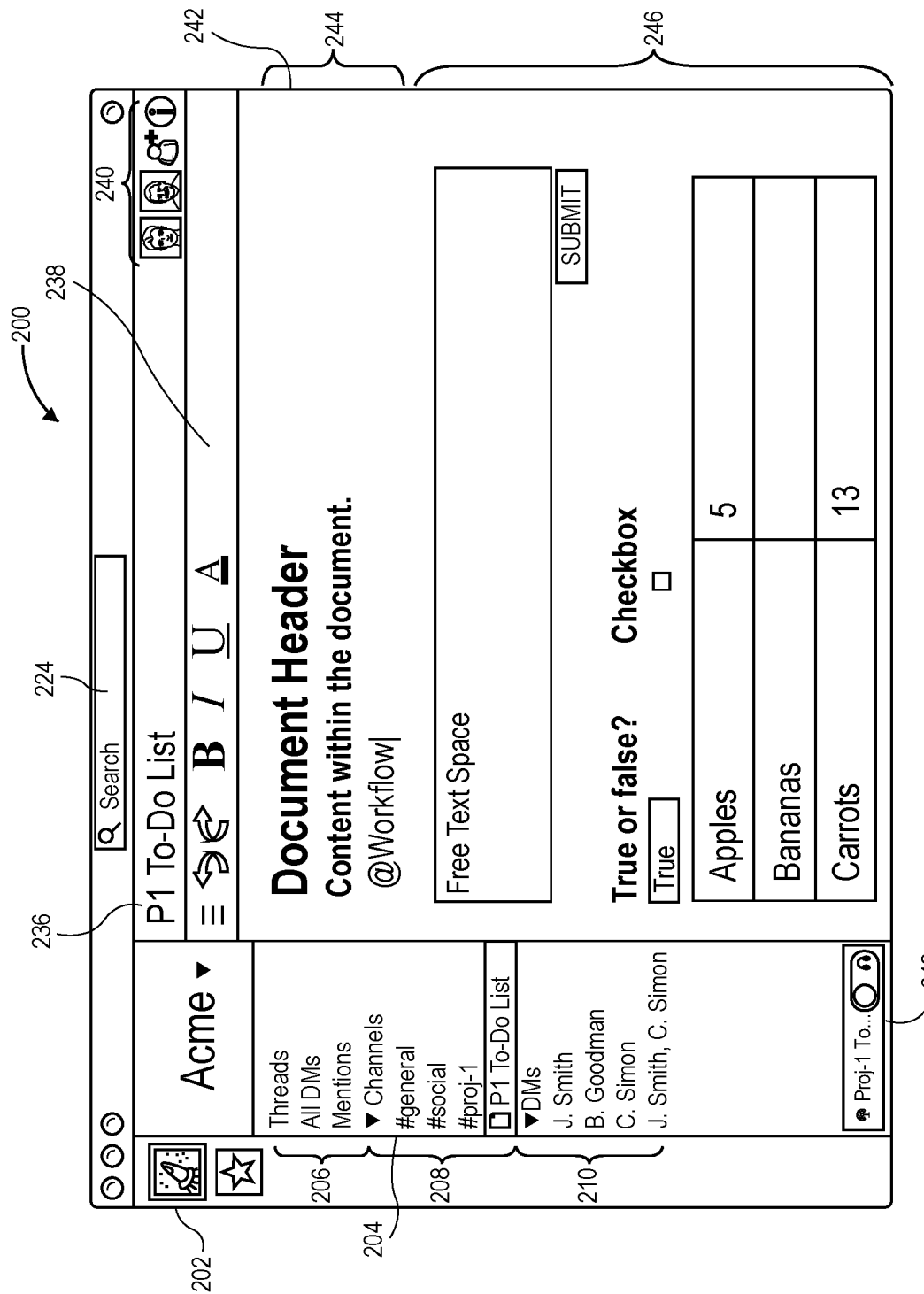
FIG. 2B depicts an exemplary embodiment of a user interface for the group-based communication system for displaying a collaborative document.

FIG. 2B, by contrast, illustrates user interface 200 when the user is displaying only a document instead of channel information. In embodiments, the document is a collaborative document allowing two or more users to review, edit, comment upon, or otherwise access the document. The collaborative document is described further below.

Where common features or elements are unchanged, they are not discussed separately from their description with respect to FIG. 2A. As illustrated, channel pane 212 and thread pane 228 have been replaced with document pane 236. In some embodiments, document pane 236 may be displayed alongside any other pane, such as channel pane 212. Document pane 236 may comprise document toolbar 238, document controls 240, and document display 242. Document display 242 may display all of the content within the document including unstructured sections 244 and structured sections 246. The functionality of document pane 236 may be provided by the group-based communication system or by a third-party integration. Although a word-processing document is depicted in document pane 236, any type of document, including a collaborative document discussed below, is contemplated for use with the invention, such as spreadsheet editing, multimedia editing, image editing, and code editing. Each type of document editing may be provided by a different third-party integration. Users can switch the currently displayed document to either another document, a channel, or a direct message by selecting another item in channel list pane 204.

Document pane 236 may include document toolbar 238, which may display icons and menus that allow for the formatting of a document. For example, document toolbar 238 may provide a user the ability to bold, italicize, or underline fonts. In some embodiments, document toolbar 238 may provide users the ability to undo and redo actions. In further embodiments, document toolbar 238 may allow a user to modify the color of text. In still further embodiments, document toolbar 238 may allow a user to insert images, tables, and/or workflows. Document pane 236 may also display metadata for the currently selected document, including document name. Document pane 236 may also include document controls 240 for viewing members with access to the document, inviting a new member to the document, viewing information about the document, or other document-related functions. For example, document controls 240 may display icons indicating which users are currently viewing the document. In some embodiments, document pane 236 may display a workflow status which indicates which workflow step the workflow is currently on. For example, a workflow status may show that the document is currently in the process of an approval workflow step and the document is awaiting approval from a specific user. In further embodiments, the workflow status may show a summary of information within the workflow document. For example, the workflow document may include a table for users to insert their shirt size, and the workflow status may include a summary of the number of shirts of each size that were entered into the table.

Collaborative Document

In some embodiments, within the group-based communication system, the document may be a collaborative document, as noted above. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. Document display 242 may display the selected collaborative document if the viewing user has sufficient permissions (e.g., a view permission). In some embodiments, a user of the group-based communication system may edit the collaborative document if they have sufficient permissions (e.g., an edit permission). In further embodiments, a user of the group-based communication system may leave comments on the collaborative document (e.g., a comment permission). As described below, permissions may be automatically assigned to collaborative documents based on, for example, the context of the collaborative document creation.

In some embodiments, collaborative documents may comprise free-form unstructured sections 244 and workflow-related structured sections 246. In some embodiments, unstructured sections 244 may include areas of the document in which a user can freely modify the collaborative document without any constraints. For example, a user may be able to freely type text to explain the purpose of the document. In some embodiments, a user may add a workflow or a structured workflow section by typing the name of (or otherwise mentioning) the workflow. In further embodiments, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some embodiments, structured sections 246 may include text entry, selection menus, tables, checkboxes, tasks, calendar events, or any other document section. In further embodiments, structured sections may include text entry spaces that are a part of a workflow. For example, a user may enter text into a text entry space detailing a reason for approval, and then select a submit button that will advance the workflow to the next step of the workflow. In some embodiments, the user may be able to add, edit, or remove structured sections of the document that make up the workflow components.

In embodiments, sections of the collaborative document may have individual permissions associated with them. For example, a collaborative document having sections with individual permissions would provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further embodiments, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In embodiments, the first user can select the plurality of collaborative documents and the "Group Information" section to effectuate permissions to access (or view, edit, etc.) to the entire user group the "Group Information" section of each of the plurality of collaborative documents.

Preview of a Collaborative Document

Figure 3A:
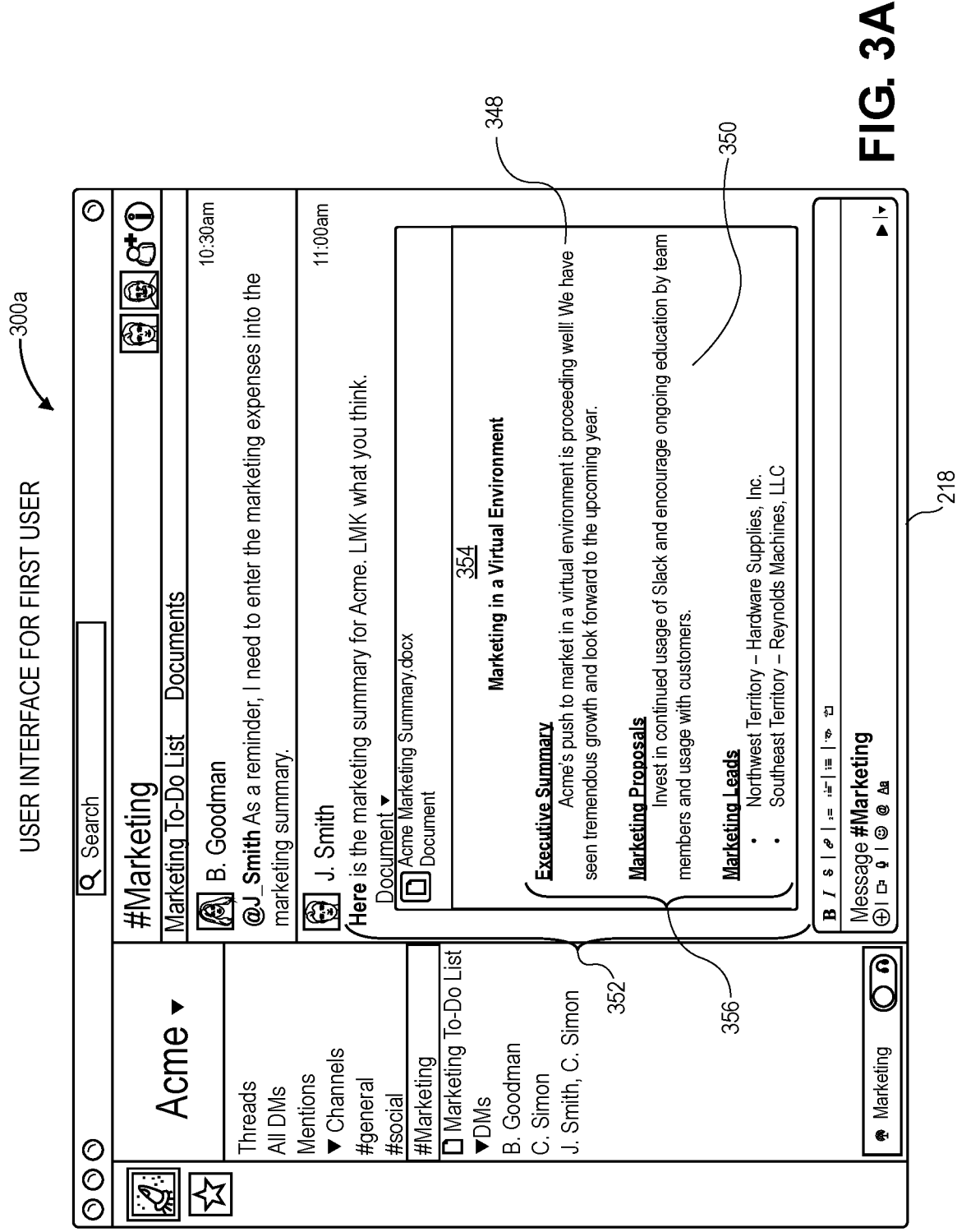
FIG. 3A depicts a user interface illustrating a first preview of a collaborative document on a first user interface associated with a first user of the group-based communication system.
Figure 3C:
FIG. 3C depicts a user interface illustrating a second preview of the collaborative document of FIGS. 3A-3B on a second user interface associated with a second user of the group-based communication system.

Exemplary use cases of embodiments are described below. As background for how a document, including a collaborative document, may be previewed within the group-based communication system, it is helpful to understand previewing of content within the group-based communication system. As shown in FIGS. 3A-3C, a preview of a collaborative document is provided within a channel of the group-based communication system. The preview is generated and caused to be displayed on the client device (i.e., rendered on the client device by computer program code). The generated preview is based on various criteria as discussed herein. Embodiments of the invention generally relate to a first preview of a collaborative document generated for a first user client device is distinct, at least in part, from a second preview of a collaborative document generated for a second user client device.

FIG. 3A illustrates a first embodiment of a preview of a collaborative document (here, a word processing document). The collaborative document is shown previewed within a channel in FIG. 3A, but it should be understood the collaborative document may also be provided within a thread associated with a channel, within a project domain or workspace, or within any other mechanism by which shared collaboration is provided to a user within the group-based communication system. The preview of FIG. 3A illustrates a word processing document entitled "Acme Marketing Summary" in a preview pane 348.

In embodiments, a preview 350 presented in preview pane 348 may be shown in a first condensed view corresponding to a condensed viewing pane in a first user's user interface 300a and then expanded to a second expanded view corresponding to an expanded viewing pane in the user interface 300a. Selection of the collaborative document in the condensed viewing pane generates the expanded viewing pane showing the collaborative document. In embodiments, the generated expanded viewing pane may be generated responsive to permissions associated with a user selecting the condensed viewing pane. Embodiments described herein are for use within a condensed or expanded viewing pane of the collaborative document.

The preview of the content is, in prior art applications, commonly a beginning portion of the content, e.g., the first quarter of a first page of a word processing document or a snippet of a website associated with a linked URL. Thus, the preview is not based on the content of the document, but rather a location of content within the document (e.g., at the beginning of the document). Yet further, the preview is not based on any user-specific indicia associated with a collaborative document, such as the permissions for a user associated with the collaborative document.

Moreover, prior art preview of collaborative documents is commonly static, meaning that the preview of the document once posted does not change even though data associated with the collaborative document changes after posting.

Embodiments of the invention thus contemplate a preview of the document in a user's user interface that is (1) based on user-specific indicia; (2) based on content-specific data; (3) based on changed document data and thereby presenting a dynamic preview; or (4) a combination of user-specific indicia, content-specific data, and changed document data.

As discussed herein, user-specific indicia include, without limitation, an indicium identifying a user (e.g., "@ J. Smith") in a collaborative document; an indicium associated with one or more permissions assigned to a user for the collaborative document (e.g., permission to view but not edit the collaborative document) or one or more sections of the document (e.g., permission to view only a particular section of the document); an indicium associated with one or more tasks assigned to the user relative to the document (e.g., input information for a particular section of the document); and/or an employee role or user status associated with the collaborative document or the group-based communication system. The provided user-specific indicia are only exemplary, and user-specific indicium should be generally understood to contemplate any information associated with the collaborative document (or a section of the collaborative document) and specific to the user or a user group. Moreover, the term "user-specific indicia" as used herein contemplates a singular indicium specific to the user or a plurality of indicia to the user. As such, for ease of reference, "user-specific indicia" may contemplate a single indicum or multiple indicia.

In embodiments, the preview of the collaborative document within the group-based communication system is dependent or otherwise based on the user-specific indicia. As a non-limiting example, the preview of the collaborative document for a first user may be different, at least in part, to the preview of the same collaborative document for a second user. That is, different users may see different previews of the same collaborative document in each user's respective user interface of the group-based communication system. As noted above, the variations in the shown preview of a collaborative document for each user may be based on the respective user's permissions associated with collaborative document or section thereof, whether the user was assigned tasks associated with the collaborative document or section thereof, the user's role in the organization associated with the group-based communication system, and other criteria discussed herein.

In yet further embodiments, the preview of the document may change as the user-specific indicia changes. For example, in a first temporal instance, the user may be assigned editing permissions for the document and tagged to complete information associated with a particular section of the document. In this first temporal instance, the preview of the document in the user's interface of the group-based communication system may show a first portion of the document, such as at least a portion of the section of the document the user is tagged to complete. The first portion of the document corresponds, at least in part, to a first preview segment provided to the user in the user interface of the group-based communication system. In embodiments, after the user completes editing of the section of the collaborative document, the user's assigned permissions change. The change of the user's permissions initiates a change in the preview of the collaborative document provided in the user interface of the group-based communication system. As such, in a second temporal instance, the user interface provides a second preview segment, at least partially distinct from the first preview segment, showing at least a second section of the document. In embodiments the second section of the collaborative document shown in the second preview segment is distinct, at least in part, from the first second of the collaborative document shown in the first preview segment.

In other embodiments, the preview may be generated based on the user's status, such as employee role. For example, a user who is a project manager may receive a preview of an "Executive Summary" section of the document, whereas a user who is a software developer may receive a preview of a "Developer Notes" section of the document. To effectuate variation of the preview in this exemplary use case, the user's employee role or status is associated with either or both the collaborative document or the group-based communication system.

Embodiments of the invention also generate the preview based on content associated with the document but not necessarily user-specific indicia. For example, the selected portion of the document to present as the preview may be based on an analysis of relevant text, graphics, or multimedia provided in the document (i.e., the content of the document). The relevance of the content may be dependent on the user (thus further qualifying as user-specific indicia), an identified purpose for the virtual space (e.g., a channel related to "Marketing Proposals"), a time stamp associated with the content (newer content in the collaborative document is presented in the preview versus older time-stamped content, thus further qualifying), or a file type of the document (e.g., word processing file, spreadsheet, video file, audio file, etc.). These relevant factors for the content of the document are merely presented as exemplary and are not intended to be limiting.

Embodiments may select the portion of the document to be previewed based on various techniques, including artificial intelligence or machine learning methods. These methods may identify relevant portions of the collaborative document for preview based on the user, the user group, a channel in which the document is posted, the user role, document content germane to the channel or working group, or other criteria. In embodiments, the preview may be generated automatically by the group-based communication system using these techniques. Collaborative documents may be analyzed individually or collectively. Various natural language processing techniques may be used in embodiments herein for analyzing files to determine topics, summaries, or key sections to determine the content for the container preview. Keywords may be determined using topic segmentation and detection methods such as, but not limited to, hidden Markov models, lexical chains, co-occurrence, clustering, topic modeling, or any combination thereof. As another example, summaries, topics, key sections, or any combination thereof may be generated using extractive and/or abstractive summarization. In some embodiments, various machine learning methods, such as the TextRank Algorithm, latent semantic analysis, Luhn's summarization algorithm, the KL-Sum algorithm, or the like may be used for analyzing the files. Neural networks, such as recurrent neural networks, concurrent neural networks, long short-term memory networks, self-attention models, or generative adversarial networks may be used alone or in conjunction with embodiments described herein for analyzing collaborative documents to select content.

Yet further, the preview section may be manually selected by a user, such that a first user may select a portion of the document to be previewed for one or more other users. For example, a user may choose to highlight a section of the collaborative document as the "preview" section to be shown in one or more user's previews of the collaborative document.

In embodiments, selection by a user of the preview may open the collaborative document at the section of the document specific to the user-specific indicia. For example, if the previewed section is "Marketing Expenses" and is selected by the system based on the user being part of the accounting department, then the user's selection of the preview opens the document to the "Marketing Expenses" section.

Embodiments of the invention also allow for dynamic preview of the collaborative document, such that the preview of the collaborative document in a particular user's user interface changes based on changed document data. As used herein, document data includes, without limitation, revisions or edits to the collaborative document, permissions associated with the collaborative document, tasks assigned relative to the collaborative document, mentions (e.g., "@ mentions") associated with the collaborative document, employee role associated with collaborative document (or a channel, thread, workspace, or user group in which the collaborative document is posted), and any other information or data discussed herein relative to the collaborative document. Upon the document data changing, the preview of the document changes for at least one or more users of the group-based communication system. Thus, the preview is dynamic—as opposed to static—to present varying previews as the document data is changed.

A non-limiting example of a dynamic preview of the collaborative document is contemplated based on changed content of the document. Specifically, embodiments contemplate the preview of the collaborative document provided in a particular user's user interface changes based on changed content of the collaborative document. In embodiments and as a non-limiting example, a first user may post the collaborative document in a channel, such that a first preview segment appears in the user interface for a second user. As the collaborative document is revised, e.g., edited by one or more users, the preview of the collaborative document in either or both the first and the second users' respective user interface changes to a second preview segment. Thus, the preview of a collaborative document presented to a user may change based on changed document data, such that the preview is a dynamic preview.

In embodiments, the dynamic preview may be generated at predetermined times after the changed content is made, e.g., generally commensurate with a user's changing the content in the collaborative document, at one hour from the user changing the content, once a day if there is changed user content, or at any other desired or scheduled time interval.

Figure 5:
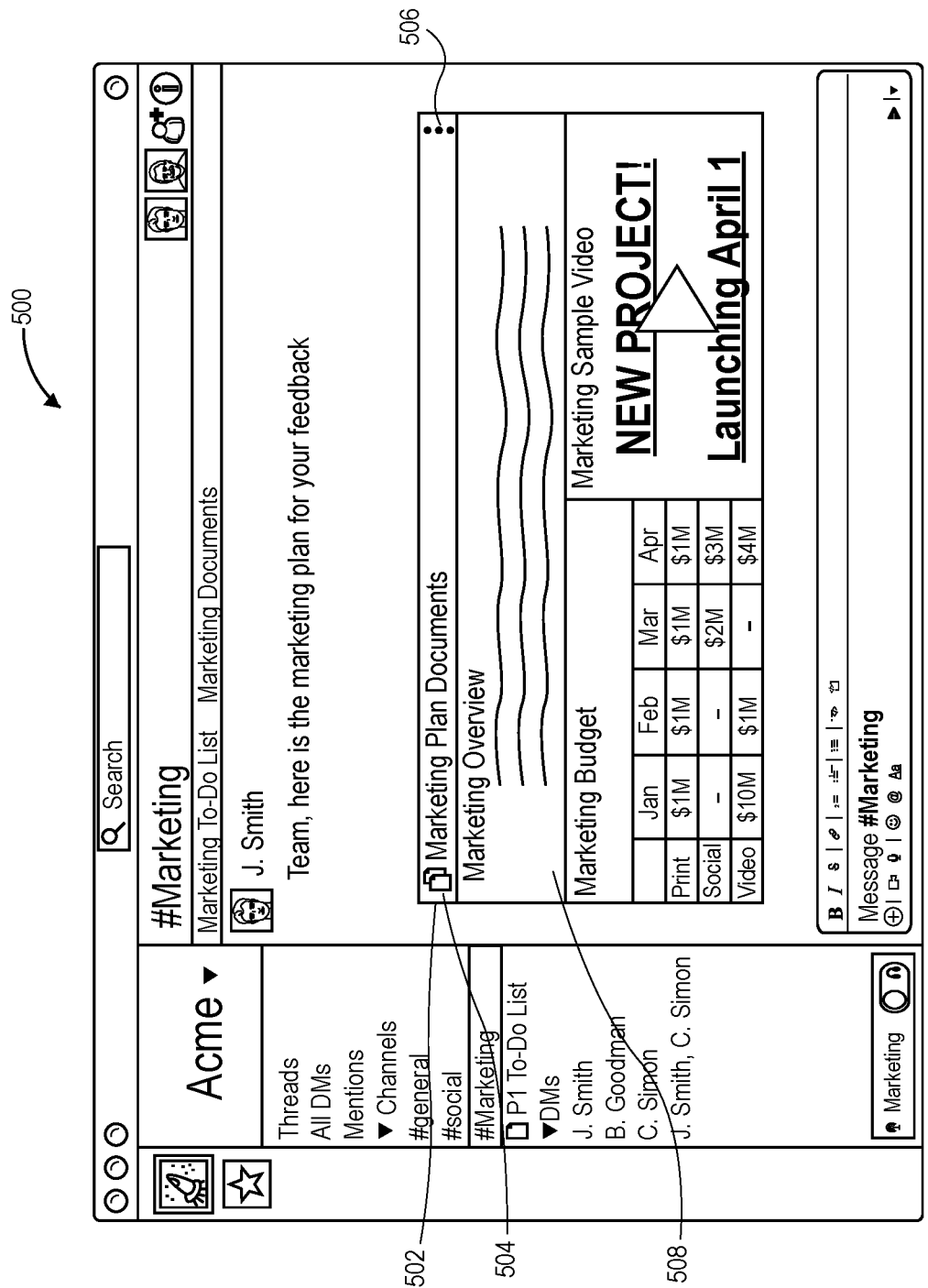
FIG. 5 depicts a user interface for the group-based communication system illustrating a container preview, where the container comprises a plurality of collaborative documents.

Embodiments of the invention further contemplate the preview may comprise portions of two or more collaborative documents. For example, a user may post a plurality of collaborative documents as part of a single message in a channel. Embodiments may preview a portion of at least one, at least some, or all the plurality of collaborative documents. When previewing portions of two or more documents, embodiments may present a preview that is a composite of the two or more collaborative documents, as shown in FIG. 5 and discussed further below. In such an instance, the portions of the two or more collaborative documents to present in the preview is based on the techniques discussed above related to selection based on user-specific indicia and/or document data change. In yet further embodiments, the presented portions of the documents are arranged based on user-specific indicia and/or document data change. For example, a collaborative document for which the user has full permissions to view and edit may be arranged first in the preview, whereas a collaborative document for which the same user has lesser permissions or is only mentioned is arranged later or second in the preview. The arrangement of the collaborative documents or the selected portion of the documents may further be automatically determined based on machine learning or artificial learning techniques, as described above. The number of collaborative documents and the arrangement of the collaborative documents or a portion of one or more collaborative documents may thus be based on the user-specific indicia, the changed document data (in the case of a dynamic preview), or both.

The preview may further arrange the documents based on the user's display area on its computing device. For example, if the number of documents is large, e.g., three or more documents, then depending on the user's display area, a preview presenting multiple document portions may be visually "squeezed" and difficult to read on the display. Embodiments of the invention contemplate adjusting the preview and the selected documents and portions of the documents based on the user's display area.

The preview of the document may also be generated with various portions of the document compiled together. For example, consider a collaborative document having a "Title" section, a "Marketing Expenses" section, a "Marketing Proposal" section, and a "Marketing Leads" section, along with other sections. The system may select the Title and the beginning of the Marketing Expenses section and compile them together to present as the preview of the document. In embodiments, the Marketing Expenses section may be selected because the user receiving the preview on their user interface has an employee role in the accounting department, and thus, marketing expenses are germane to the user's job duties. In contrast, for a second user that is developing marketing proposals, a preview of the collaborative document may include the Title of the document and a portion of the Marketing Proposals section to display to the second user. Yet further, a third user that is a project manager may see a preview that includes the Title and headers for all sections, e.g., "Marketing Proposals," "Marketing Leads," and other section headers, with the intent the project manager user can see all sections of the collaborative document in the preview. Thus, embodiments of the invention can select two or more sections of the collaborative document, compile the sections together, and present the compilation as the preview for the user.

As discussed more fully below relative to FIGS. 3A-3C and 4A-4C, embodiments of the invention contemplate a user-specific preview, a content-specific preview, a manually selected preview, a dynamic preview, or a preview that is any combination of a user-specific preview, a content-specific preview, a manually selected preview, or a dynamic preview. Thus, the group-based communication system's selection or generation of the preview for a particular user or the initiation of a change to a user's preview of the collaborative document may be dependent on the user-specific indicia, the content of the document, a manual selection by a user, a change in the document data, or any one or all the above. Exemplary use cases are provided below and are not intended to be limiting.

Container Preview for Collaborative Documents

As discussed below relative to FIG. 5, embodiments allow for a user to create a container comprising one or more collaborative documents. For example, a user may request to create a new container for files and name the container "Marketing Documents." The container request may be associated with a virtual space, such as a channel, a workspace, a synchronous multimedia collaboration session, a direct message, or a multi-person direct message. In some embodiments, a container may be created in association with a document. For example, a document may exist outlining onboarding policies for new hires of a company that may vary depending on at which of several offices of the company the new hire is working. A user may create a container within the onboarding document that can group several files corresponding to office-specific policies, allowing these office-specific documents to be included in the larger document. A container may be any structure for grouping multiple files and associating the multiple files together. In some embodiments, a container will be created automatically when a user uploads multiple files simultaneously. In further embodiments, a container may be created if the group-based communication system determines that multiple files have a common topic or purpose and should therefore be associated together. In still further embodiments, a request to create a container may be associated with a synchronous multimedia collaboration session such that the container and the associated files will persist after the synchronous multimedia collaboration session. For example, a hosting user may be hosting a large conference within a group-based communication system for attending users across multiple organizations. The hosting user may wish to collect papers from anyone who is presenting during the conference, as well as other documents from the attending users. The hosting user may create a container such that any user attending the conference can submit files as well as access any file submitted from any other user even after the conference ends.

One or more users may add files to the container. The files are associated with the container upon receipt, i.e., upon the user selecting the files to be added. Alternatively, the files are added to the container upon administrator approval. In some embodiments, files may be received individually. In further embodiments, a plurality of files may be received from one or more users of the group-based communication system. For example, multiple users from within a marketing channel may submit documents to a container associated with a marketing plan for a new product release. The files may be submitted from within the group-based communication system, or from an external source. In some embodiments, the files may be files already associated with the group-based communication system. In further embodiments, the files may be received in response to a prompt sent to a user to submit files for the container. For example, a first user may send a message within the group-based communication system to a second user requesting the second user to upload their photos taken during a promotional event. If the second user replies with one or more files attached, the one or more files may automatically be added to the container. In some embodiments, the files may all be of the same file type. For example, the files may be video files. In other embodiments, the files may be a mix of different types, such as documents or other text files, videos, images, spreadsheets, and presentations.

The container may include a preview of the container to be presented in a user interface. In embodiments, a user may request to view the preview of the container, or the preview may be automatically presented to the user in the user interface, e.g., presented in a channel. In some embodiments, the preview of the container may be automatically generated when a user accesses a virtual space where the container is posted. In other embodiments, a request to preview the container will only occur if the user actuates the container. For example, a channel may only display the name of the container and require user interaction indicating that the user wants to view the container preview.

In embodiments, the preview of the container is generated based on the above-discussed parameters, including user-specific indicia associated with one or more collaborative documents contained in the container, the container content (or content of the collaborative documents in the container), and/or changed document content. In yet further embodiments, the generated preview of the container is dependent on user-specific indicia associated with the container itself (e.g., a creator of the container). In embodiments, the container preview may be based on the file type of the collaborative documents within the container. In further embodiments, the container preview may be determined on the majority file type within the container. For example, if most of the collaborative documents in the container are video files, then the container preview may also be a video. In some embodiments, the container preview may be a combination of multiple file types, such as a collaborative document with images, videos, or spreadsheets inserted into the document.

In embodiments where the container preview is generated based on the content within the plurality of collaborative documents, the preview may include a selected arrangement of portions of one or more collaborative documents in the container to highlight important or notable content within the collaborative document. For example, the method may try to identify portions of the collaborative documents which summarize the document, such as a summary section, a table of contents, an introduction, a conclusion, or an executive overview, by analyzing the document.

In some embodiments, selection of the content for the content preview may be based in part on the file types and the container preview type. As an example, if the file type is determined to be a video, preference may be given to video content from within the container. In some embodiments, content may be determined based on which documents, and which portions of those documents, were recently modified. For example, a text document which recently had a summary added to it may be prioritized over other documents which have not been recently modified. A container preview may be more beneficial to certain users if the preview focuses on changes.

In further embodiments, the content for the container preview may be user specific and based in part on information related to the user requesting the preview container, including which files the user has previously accessed, the amount of time the user has spent with certain files, the amount of changes the user has made to certain files, and any information about the user's use of the group-based communication system including which virtual spaces the user frequents, the role, title, or position of the user, or past interactions between the user and other users of the group-based communication system. As an example of a user-specific preview, a user with an executive role who had not previously interacted with any of the documents may see a preview that prioritizes high level summaries. As another example, a user of the finance team may see a preview that highlights financial summaries and/or spreadsheets within the container. Yet another example, a member of the marketing team who worked exclusively on a marketing presentation may see a preview prioritizing recent changes to the marketing presentation. In some embodiments, a user-specific container preview may select content based on one or more permissions of the user. For example, a user without permissions to view a financial spreadsheet may see a container preview that omits any information from the financial spreadsheet.

In embodiments, the generated container preview may be a video generated as a compilation of introduction sections from multiple video files within the plurality of collaborative documents. In such an embodiment, the container may begin playing the video upon being selected by or transmitted to the user. In some embodiments, the container preview may be an amalgamation of multiple files. The container preview may provide a user with an overview of the files in the container. In some embodiments, the container preview may be a static image generated when the request to preview the container was received. In further embodiments, the container preview may be generated as a JavaScript Object Notation (JSON) object which permits the user to interact with the container preview. For example, a portion of the container preview may include a presentation with multiple slides and the user may be able to traverse through the multiple slides within the generated container preview.

The container preview may allow a user of the group-based communication system to interact with the container preview. Interactions with the container preview may include allowing the user to select a portion of the container preview to automatically navigate to a collaborative document corresponding to the portion selected. In some embodiments, the container preview may be transmitted using asynchronous JavaScript and XML (AJAX).

Similar to dynamically changing a preview based on changed content of the document, embodiments further contemplate dynamically changing a container preview based on changes to the container or collaborative documents within the container. As an example of such a change, a new section may have been added to a document within the container along with additional content, thus causing the preview to change to show at least a portion of the newly added section. As another example of such a change, a user of the group-based communication system may have changed the content in a collaborative document, including replacing the collaborative document entirely with a new collaborative document. In some embodiments, the update may correspond to a new collaborative document being added to the container. For example, an additional spreadsheet for advertising effectiveness projections may have been uploaded to a container for a marketing rollout of a new product. If an update is received, the container preview is dynamically changed to present a changed container preview to one or more users viewing the container. In some embodiments, one or more portions of the container preview may be automatically updated using AJAX. If no update is received, then the method ends.

Exemplary Use Cases

Figure 4A:
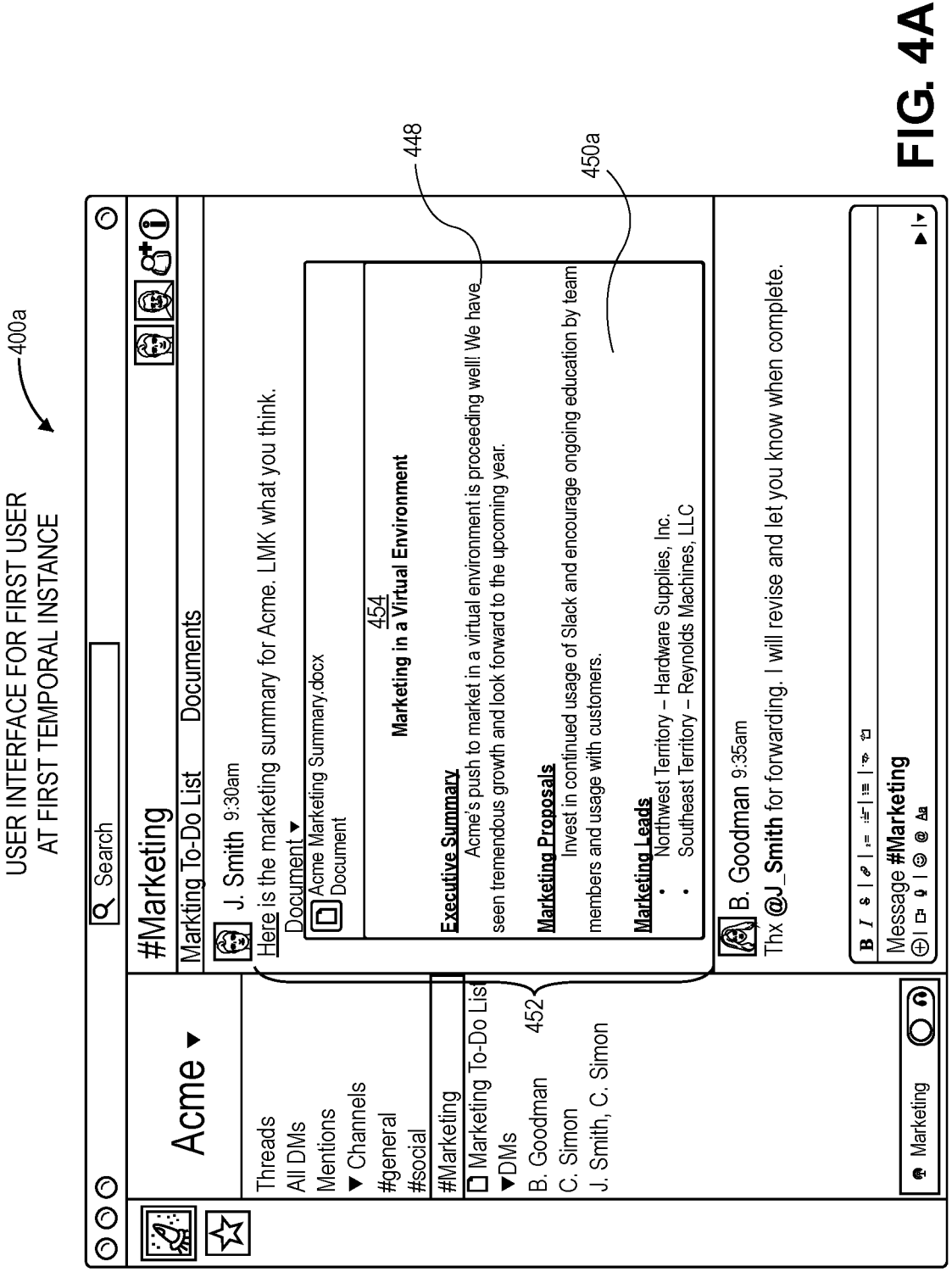
FIG. 4A depicts a user interface illustrating an original preview of a collaborative document on a first user interface associated with a first user of the group-based communication system.

FIGS. 3A-3C, 4A-4C, and 5 illustrate exemplary use cases for embodiments of the invention. Specifically, FIGS. 3A-3C illustrate a use case of the preview for a collaborative document for a first user being distinct from the preview of the same collaborative document for a second user based on user-specific indicia. FIGS. 4A-4C illustrate a use case of the preview dynamically changing based on changed content of the collaborative document. FIG. 5 illustrates a use case of a container preview.

Turning to FIGS. 3A-3C, these figures illustrate embodiments of the invention generating a preview of a collaborative document for a first user distinct from a preview of the same collaborative document for a second user. In this exemplary use case, the generated first and second previews are distinct based on user-specific indicia associated with either or both the first and second users.

FIG. 3A illustrates a first user interface 300a for a first user of the group-based communication system. In FIG. 3A, the first user interface 300a includes channel display 218 associated with channel #Marketing. The channel includes a plurality of communications posted by members of the channel. Communication 352 is entered by the first user, here "J. Smith." In this communication, the first user posts a collaborative document 354. A first preview 350 of the collaborative document is shown in a first preview pane 348 in the channel display 218. In this exemplary instance, the first preview 350 presents a beginning section 356 of the collaborative document that includes a title of the document.

For the collaborative document of FIG. 3A, the first user has inserted a "mention" to a second user, "B. Goodman," by typing "@B_Goodman" under the "Marketing Expenses" section of the document. This is shown in FIG. 3B, which illustrates the first and second pages of the collaborative document, which in this non-limiting example is a word processing document. On the first page, indicated by Page 1 at the bottom of the page, the Title of the document "Marketing in a Virtual Environment" is provided, along with an "Executive Summary" section. On the second page of the collaborative document, indicated by Page 2 at the bottom of the page, the section "Marketing Expenses" is provided, along with the mention "@B_Goodman" inserted by the first user.

FIG. 3C illustrates a second user interface 300b for a second user of the group-based communication system. In exemplary FIG. 3C, the second user is B. Goodman, which is the same user mentioned in the collaborative document 354 by the first user with reference to FIG. 3A. In FIG. 3C, the second user interface includes a second preview pane 358 for presenting a second preview 352 and associated with channel #Marketing, similar to the first user interface for the first user. The channel includes a plurality of communications posted by members of the channel. Communication 352 shown in FIG. 3C is the same communication 352 shown in FIG. 3A and entered by the first user, such that the second user can view on their user interface the communication 352 entered in #Marketing channel by the first user.

In FIG. 3C, the second preview 352 of the collaborative document in the second user interface 300b is illustrated. The second preview 352 is for the same collaborative document 354 posted by the first user in the communication 352. Notably, the second preview 352 of the collaborative document 354 in the second user interface is distinct from the first preview 350 of the same collaborative document 354 in the first user interface. The second preview 352 is generated based on the user-specific indicia of the second user, i.e., B. Goodman. Here, the second preview 352 includes the Title of the document compiled (or otherwise composited) with the section header for "Marketing Expenses," which is the section of the document including the mention "@B_Goodman." Thus, when viewing the second preview 352 in the second user interface, the second user (B. Goodman) sees their user identifier ("B_Goodman") mentioned in the document. The second user, B. Goodman, is in the accounting department, and therefore, marketing expenses are germane to the second user's job duties. Thus, embodiments of the invention compile two or more sections of the collaborative document and present specific sections of the document based on the user-specific indicia of the second user. In this exemplary case, the user-specific indicia includes either or both of the user's employee role (in the accounting department) and/or the "mention" of the second user in the collaborative document.

In contrast and as noted above, the first preview 350 for the first user of the same collaborative document illustrates different sections of the document. In the first preview, the "Title" section of the document is the same as previewed for the second user, but the remaining sections of the document previewed for the first user are distinct from the second user's previewed sections, such that the preview for the second user is distinct, at least in part, from the preview of the first user.

It should be appreciated that the above exemplary use case is described with respect to first and second users. However, the previews for any of the users associated with the group-based communication system may change depending on the permissions for each respective user relative to each collaborative document. Thus, a first user may post a collaborative document. A second user may edit the collaborative document. Upon the first user posting the document but prior to the second user editing the document, a third user may initially only have permission to view the collaborative document in a preview only and not have access to the entirety (or even a portion) of the document. However, upon the user editing the document, the third user may be granted access to a select portion of the document because the user has permission to access, view, or otherwise edit the select portion of the document. Thus, the preview presented to the third user in the third user's user interface would change from the initial preview to a preview presenting at least a portion of the select portion of the document the third user is permitted to access.

Turning to FIGS. 4A-4C, these figures illustrate embodiments of the invention generating a dynamic preview of a collaborative document for a user based on changes to the content of the document.

FIG. 4A illustrates a first user interface 400a for a first user of the group-based communication system at a first temporal instance. Here, FIG. 4A illustrates the first user interface 400a for the first user, "J. Smith," posting collaborative document 454 that is a word processing document entitled "Marketing in a Virtual Environment." In FIG. 4A, the first user interface 400a includes preview pane 448 associated with communication 452 in channel #Marketing. The channel includes a plurality of communications posted by members of the channel. In communication 452, the first user (J. Smith) posted the collaborative document 454 shown in an original preview 450a of the first user interface 400a. In this exemplary instance, the preview 450a is an original preview presented at a first temporal instance, e.g., upon the first user posting the document in-channel.

As noted above, the embodiment of FIGS. 4A-4C illustrates a change to the preview responsive to a change in the document data. FIG. 4B illustrates the two different versions of the collaborative document, which in this non-limiting example is a word processing document. Revising the document results in changed document data. In the first version, identified as VERSION 1, the Title of the document "Marketing in a Virtual Environment" is provided, along with an "Executive Summary" section indicated by the header "Executive Summary." Comparing VERSION 1 of the collaborative document to the changed preview in FIG. 4C (i.e., the dynamic preview), it can be seen that the original preview 450a generated and displayed on the first user interface 400a at a first temporal instance includes a section of the collaborative document, including the Title and the Executive Summary section.

At some time after display of the original preview 450a on the first user interface (i.e., at a second temporal instance), a user, such as the second user, modifies the collaborative document to create a second versions, identified as VERSION 2 of the document (as indicated at FIG. 4B). As can be seen in FIG. 4B, the collaborative document has been modified to revise the header "Executive Summary" to "Goals for ACME Marketing," along with other changes.

Responsive to the second user modifying the collaborative document 454, the system automatically generates a dynamic preview 450b for the first user that is changed from the original preview 450a shown in FIG. 4A. Specifically, FIG. 4C illustrates the first user interface 400a, including the communication 452 posted by the first user and including a changed preview 450b of the collaborative document. The user interface of FIG. 4C illustrates the first user interface 400a at a second temporal instance after the first temporal instance. As noted above, the second temporal instance may be predetermined or scheduled and may be commensurate in time with the changing of the content or at a time after the content is changed. As shown in FIG. 4C, the changed preview 450b of the collaborative document is generated and presented, as compared to the original preview 450a. The changed preview of the document shows the changed content, specifically the revision of "Executive Summary" to "Goals for ACME Marketing," along with other changes to the collaborative document. In embodiments, the changed preview 450b rendered for display on the first user interface 440a is generated in response to the content of the collaborative document being changed. Thus, the changed preview 450b at the second temporal instance is distinct, at least in part, from the original preview 450a at the first temporal instance, where the second temporal instance occurs later in time to the first temporal instance. The changed preview is a dynamic preview because it dynamically changes response to changed content in the collaborative document.

In embodiments, the system may present an indicator 460 indicating to the user the preview has been changed from an original preview. The indicator may comprise a symbol, alphanumeric text, a change in the color of the preview or a bounding box for the preview, a flash or other user interface mechanism to draw attention to the changed preview, or any other visual or audio indicator that the preview has been changed from an original preview.

Turning to FIG. 5, a container preview in a user interface 500 of a group-based communication system is illustrated. FIG. 5 depicts user interface 500 for the group-based communication system as applied for certain embodiments. A channel pane is depicted showing container 502. In some embodiments, container 502 may be shared within a virtual space. For example, a user may have posted the container in a channel as a way of collecting documents from other users of the channel. In some embodiments, container 502 may include container header 504, container menu 506, and container preview 508.

Container header 504 may include information about container 502, including a title for container 502. In some embodiments, container header may include additional information on container 502, such as when the last update was made to container 502, which file was last updated within container 502, or when container 502 was created. In further embodiments, container header 504 may display which users within the group-based communication system are currently accessing files within container 502. In still further embodiments, container header 504 may indicate a permission status for one or more users within the group-based communication system.

Container menu 506 may provide options for users of the group-based communication system to interact with the container. Container menu 506 may include an option for a user of the group-based communication system to add additional collaborative documents to the container. In some embodiments, container menu 506 may include an option for users to view additional information about container 502, such as the number of collaborative documents within the container, the names of collaborative documents, and the types of collaborative documents (e.g., file types) within the container. Additional information may also be visible such as when the container was created, which, if any, virtual space the container is associated with, and which user created the container. In some embodiments, container menu 506 may allow users to modify the permissions of one or more files within container 502, or the permissions for container 502 itself. Container menu 506 may also permit a user to share the container to other users of the group-based communication system or to other virtual spaces within the group-based communication system. In some embodiments, sharing the container may automatically assign permissions to the files within the container. In further embodiments, a user may only be able to share a subset of files within the container which the user has permission to share. Container menu 506 may also permit the user to download one or more files within the container, or to download the entire container. In some embodiments, the downloaded files may be grouped and compressed. A user may download an entire container such that a compressed file containing all the files within the container is stored locally, for example.

Container preview 508 may display a summary of the collaborative documents located within container 502. In some embodiments, container preview 508 may display portions of individual collaborative documents separately. As an example of displaying collaborative documents separately, a container 502 containing a text file and a picture file may display container preview 508 as primarily the text file with a portion of container preview 508, such as the corner, displaying the picture file as a picture-in-picture feature. In such picture-in-picture embodiments, the sections may contain file information such as the name of the collaborative documents. In other embodiments, multiple collaborative documents may be compiled or composited together and displayed as one single preview. As an example of collaborative documents being displayed together, an image file may be displayed within a text file as if the image file were included within the text file. As another example, multiple text files may be merged to create a summary of the multiple text files. In some embodiments, videos displayed within container preview 508 may include closed captioning. In embodiments, the preview may include identifying information on the content, number, type, or other characteristic of the collaborative documents. In yet a further embodiment, the preview may include a symbol or other indicator indicating to the user the container includes a plurality of collaborative documents, including a number identifying the number of collaborative documents.

In some embodiments, individual collaborative documents may be selected for an enhanced preview of the individual document. In further embodiments, the enhanced preview of the individual collaborative documents may permit the user to see the entire document from within the group-based communication system without requiring the user to download the file locally. For example, a user may select a portable document format (PDF) file from within container preview 508. The group-based communication system may provide an enhanced preview of the PDF file that permits the user to browse through the PDF file without having to save the PDF file locally.

Figure 6:
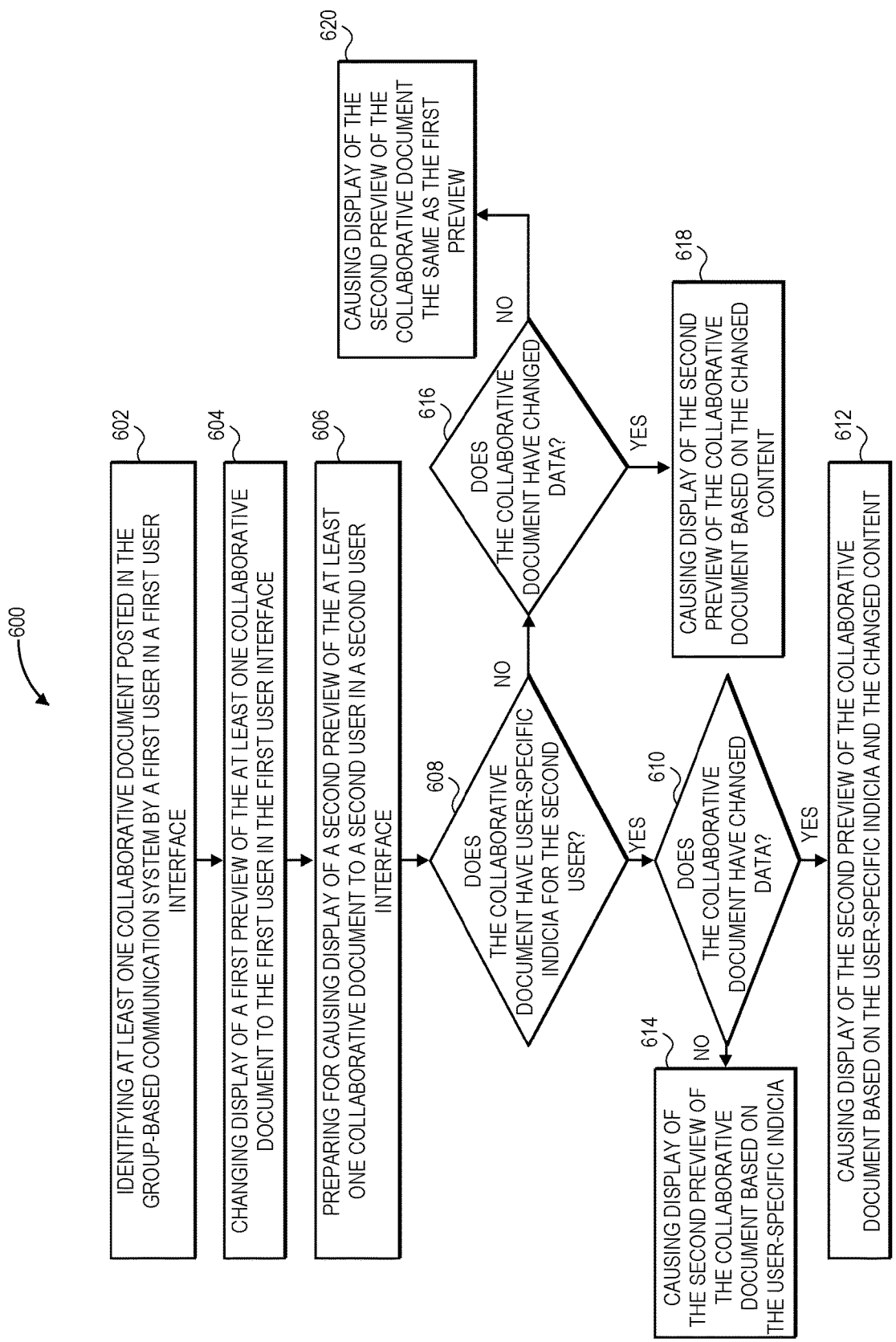
FIG. 6 is a flowchart relating to embodiments of the invention illustrated, at least in part, in FIGS. 3A-3C and 4A-4C.

Turning now to FIG. 6, a flow chart of Steps 600 of a first method of embodiments of the invention is provided. Step 602 includes identifying at least one collaborative document posted in the group-based communication system by a first user in a first user interface. Step 604 includes causing display of a first preview of the at least one collaborative document to the first user in the first user interface. Step 606 includes preparing for causing display of a second preview of the at least one collaborative document to a second user in a second user interface. Step 608 includes a decision block that queries if the collaborative document has user-specific indicia for the second user. If YES responsive to Step 608, the method proceeds to Step 610 including a decision block that queries if the collaborative document has changed data. If YES responsive to Step 610, the method proceeds to Step 612 including causing display of the second preview of the collaborative document based on the user-specific indicia and the changed content. If NO responsive to Step 610, the method proceeds to Step 614 including causing display of the second preview of the collaborative document based on the user-specific indicia.

If NO responsive to Step 608 the method proceeds to Step 616 including a decision block that again queries if the collaborative document has changed data. If YES responsive to Step 616, the method proceeds to Step 618 including causing display of the second preview of the collaborative document based on the changed content. If NO responsive to Step 616, the method proceeds to Step 620 including causing display of the second preview of the collaborative document substantially the same as the first preview.

Steps 606-620 may be repeated at predetermined cycles or at scheduled times for the purpose of determining if the collaborative document has any new or updated user-specific indicia or changed content. Moreover, Steps 608 and 610 can be reversed in order.

Figure 7:
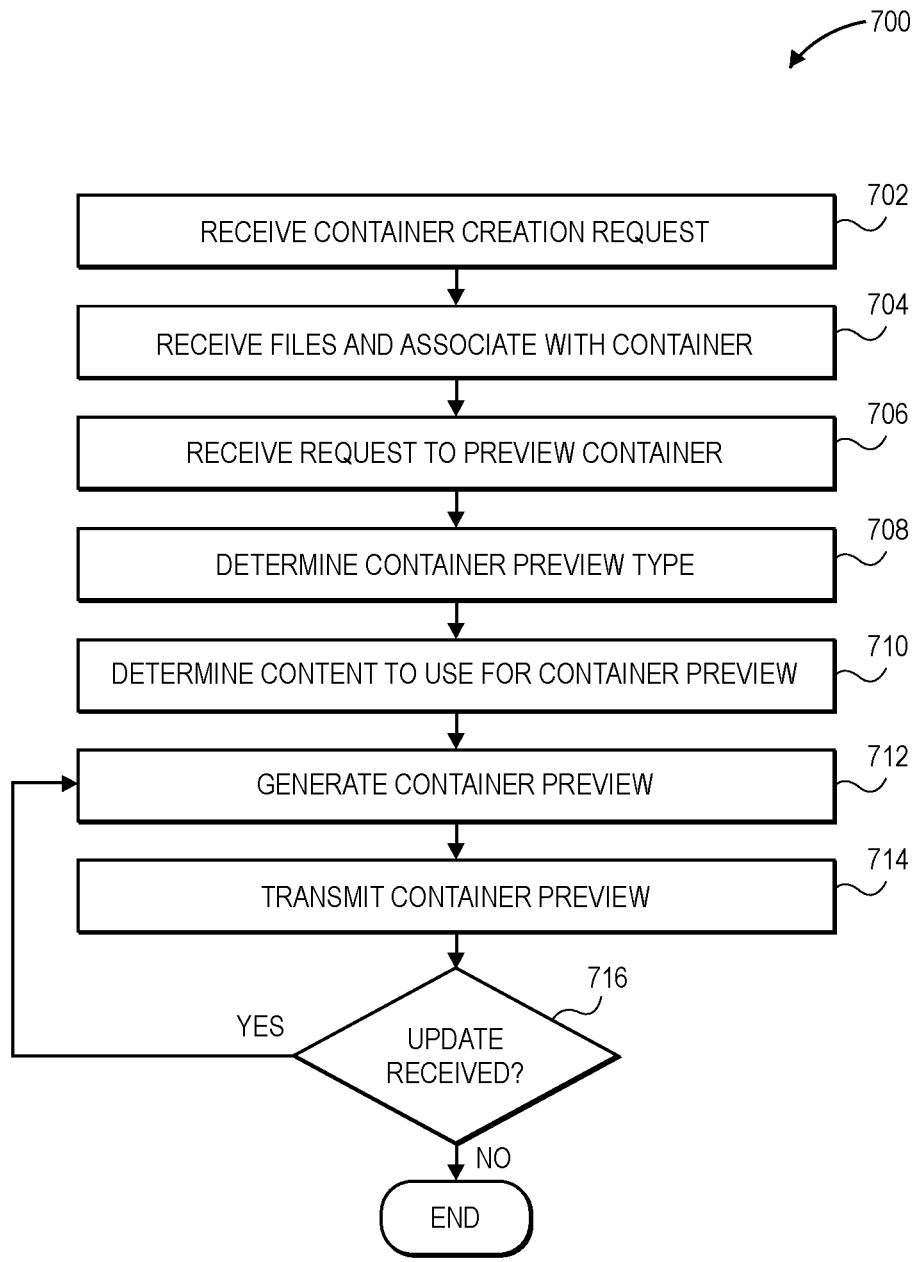
FIG. 7 is a flowchart relating to embodiments of the invention illustrated, at least in part, in FIG. 5.

Turning now to FIG. 7, a flow chart of Steps 700 of a second method of embodiments of the invention is provided. In the Steps 700, a plurality of collaborative documents associated with a container are selected for display in a preview. Step 702 includes receiving a request from a creating user to create a container. The container may include a plurality of documents including collaborative documents or other types of files. The container may be shareable to members of a channel or across channels or direct messages. In some embodiments, the request to create a container may be initiated from within a virtual space to automatically associate the container with the virtual space. Step 704 includes receiving collaborative documents or other files associated with the container that are added to the container by the creating user of the container or other members with access to the container. In some embodiments, a prompt may be sent to other members with access to the container requesting files. Step 706 includes receiving a request to preview the container. A request to preview the container may be automatically generated by a user visiting a virtual space containing the container as posted in the virtual space. For example, a container may be created within a marketing channel and automatically posted to the marketing channel. Any user subsequently viewing the marketing channel and seeing the container posted within the marketing channel will automatically submit a request to preview the container. Step 708 includes determining a container preview type. The container preview type may be based in part on the file types within the container, including if the files within the container are collaborative documents or non-collaborative files. In some embodiments, the container preview type may vary based on information about a user associated with the request to preview the container. For example, the container preview type may be determined to be a video for a user with a preference for video content. User preferences may either be submitted by the user or determined based on the user's actions within the group-based communication system. Step 710 includes determining content to use for the container preview. As discussed above relative to FIG. 5, the determination of the content for the container preview may be based on various criteria such as the determined container preview type, a virtual space associated with the container, or file content relevant to the virtual space. In some embodiments, content for the container preview may be based in part on information about a user associated with the container preview request such as the user's role, the user's access to files within the container, and the user's past involvement with one or more files within the container. For example, content may be highlighted within the container preview if the content was recently added to a collaborative document within the container and the content has not yet been seen by the user requesting the container preview. Step 712 includes generating the container preview. In some embodiments, generating the container preview comprises compiling the content determined in Step 710 and formatting the content consistent with the container preview type determined in Step 708. Step 714 includes causing display of the container preview. As discussed, the container preview may be displayed based on the first user creating the container or based on changes made by one or more other users. The display of the container preview may be displayed to a user associated with the request to preview the container. For example, the container preview may be displayed in response to a user viewing a channel where the container was posted. Step 716 includes repeating the generation of the container preview (Step 712) and causing display of the container preview (Step 714) responsive to updated information, as discussed above for Steps 600 of FIG. 6. For example, if a container preview heavily featured content from an executive summary section of a collaborative document, and the executive summary section was later revised to include additional content, the container preview may be updated to focus on the additional content.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for causing display on a client device of a preview of collaborative documents in a user interface of a group-based communication system, the method comprising:
 identifying a plurality of collaborative documents posted in the group-based communication system by a first user in a first user interface;
 compiling a plurality of first portions of the plurality of collaborative documents into a first composite image;
 compiling a plurality of second portions of the plurality of collaborative documents into a second composite image,
  wherein the plurality of second portions are selected based on user-specific indicia unique to a second user, and
  wherein the plurality of second portions are distinct, at least in part, from the plurality of first portions;
 displaying the first composite image as a first preview of the plurality of collaborative documents in the first user interface to the first user; and
 displaying the second composite image as a second preview of the plurality of collaborative documents in a second user interface to the second user.

2. The non-transitory computer-readable media of claim 1, wherein the plurality of collaborative documents includes a video file, and wherein an image of the video file is displayed in the first preview or the second preview.

3. The non-transitory computer-readable media of claim 1, further comprising:
 receiving a selection, by the second user, of one of the plurality of second portions displayed within the second preview, and
 displaying, in the second user interface, a collaborative document containing a selected portion,
  wherein the collaborative document is displayed at a location within the collaborative document corresponding to a section associated with the user-specific indicia of the second user.

4. The non-transitory computer-readable media of claim 1, wherein the user-specific indicia is selected from a group consisting of:
- a user-identifying indicium identifying the second user in one of the plurality of collaborative documents;
- a permissions indicium associated with one or more permissions assigned to the second user for the plurality of collaborative documents;
- a task indicium associated with one or more tasks assigned to the second user relative to the plurality of collaborative documents; and
- a user role or user status of the second user associated with the plurality of collaborative documents or the group-based communication system.

5. The non-transitory computer-readable media of claim 1, wherein at least one of the plurality of second portions are selected based on content associated with the plurality of collaborative documents that is not user-specific indicia.

6. The non-transitory computer-readable media of claim 5, wherein the content is selected from a group consisting of:
- a relevance of the content to a virtual space associated with the plurality of collaborative documents;
- a time stamp associated with the content; and
- a file type of the plurality of collaborative documents.

7. The non-transitory computer-readable media of claim 1,
wherein the second preview of the plurality of collaborative documents is additionally based on changed data of at least one document of the plurality of collaborative documents, such that the second preview caused to be displayed to the second user dynamically changes in response to the changed data,
wherein the changed data of a collaborative document is initiated by one of the first user, the second user, or a third user.

8. A method for causing display of a preview of collaborative documents in a user interface of a group-based communication system on a client device, the method comprising:
identifying a plurality of collaborative documents posted in the group-based communication system by a first user in a first user interface;
compiling a plurality of first portions of the plurality of collaborative documents into a first composite image;
compiling a plurality of second portions of the plurality of collaborative documents into a second composite image,
wherein the plurality of second portions are selected based on user-specific indicia unique to a second user, and
wherein the plurality of second portions are distinct, at least in part, from the plurality of first portions;
displaying the first composite image as a first preview of the plurality of collaborative documents in the first user interface to the first user; and
displaying the second composite image as a second preview of the plurality of collaborative documents in a second user interface to the second user.

9. The method of claim 8, wherein the plurality of collaborative documents includes a video file, and wherein an image of the video file is displayed in the first preview or the second preview.

10. The method of claim 8, further comprising:
receiving a selection, by the second user, of a selected portion of the plurality of second portions displayed within the second preview, and
displaying, in the second user interface, a collaborative document containing the selected portion,
wherein the collaborative document is caused to be displayed at a location within the collaborative document corresponding to a section associated with the user-specific indicia unique to the second user.

11. The method of claim 8, wherein the user-specific indicia is selected from a group consisting of:
- a user-identifying indicium identifying the second user in one of the plurality of collaborative documents;
- a permissions indicium associated with one or more permissions assigned to the second user for the plurality of collaborative documents;
- a task indicium associated with one or more tasks assigned to the second user relative to the plurality of collaborative documents; and
- a user role or user status of the second user associated with the plurality of collaborative documents or the group-based communication system.

12. The method of claim 8, wherein at least one of the plurality of second portions are selected based on content associated with the plurality of collaborative documents that is not user-specific indicia.

13. The method of claim 12, wherein the content is selected from a group consisting of: a relevance of the content to a virtual space associated with the plurality of collaborative documents; a time stamp associated with the content; and a file type of the plurality of collaborative documents.

14. The method of claim 8,
wherein the second preview of the plurality of collaborative documents is additionally based on changed data of one or more of the plurality of collaborative documents, such that the second preview displayed to the second user dynamically changes in response to the changed data of the collaborative documents,
wherein the changed data of the collaborative documents is initiated by one of the first user, the second user, or a third user.

15. A system comprising at least one processor and at least one non-transitory memory storing computer executable instructions that when executed by the at least one processor cause a preview of collaborative documents to display in a user interface of a group-based communication system on a client device, wherein generating the preview comprises:
identifying a plurality of collaborative documents posted in the group-based communication system by a first user in a first user interface;
compiling a plurality of first portions of the plurality of collaborative documents into a first composite image;
compiling a plurality of second portions of the plurality of collaborative documents into a second composite image,
wherein the plurality of second portions are selected based on user-specific indicia unique to a second user, and
wherein the plurality of second portions are distinct, at least in part, from the plurality of first portions;
displaying the first composite image as a first preview of the plurality of collaborative documents in the first user interface to the first user; and
displaying the second composite image as a second preview of the plurality of collaborative documents in a second user interface to the second user.

16. The system of claim 15, wherein the plurality of collaborative documents includes a video file, and wherein an image of the video file is displayed in the first preview or the second preview.

17. The system of claim 15, further comprising:
receiving a selection, by the second user, of the second preview, and
displaying, in the second user interface, a collaborative document associated with the second preview,
wherein the collaborative document is caused to be displayed at a location within the collaborative document corresponding to a section associated with the user-specific indicia unique to the second user.

18. The system of claim 15, wherein the user-specific indicia is selected from a group consisting of:
a user-identifying indicium identifying the second user in one of the plurality of collaborative documents;
a permissions indicium associated with one or more permissions assigned to the second user for the plurality of collaborative documents;
a task indicium associated with one or more tasks assigned to the second user relative to the plurality of collaborative documents; and
a user role or user status of the second user associated with the plurality of collaborative documents or the group-based communication system.

19. The system of claim 15, wherein at least one of the plurality of second portions are selected based on content associated with the plurality of collaborative documents that is not user-specific indicia selected from a group consisting of:
a relevance of the content to a virtual space associated with the plurality of collaborative documents;
a time stamp associated with the content; and
a file type of the plurality of collaborative documents.

20. The system of claim 15,
wherein the second preview of the plurality of collaborative documents is additionally based on changed data of one or more of the plurality of collaborative documents, such that the second preview displayed to the second user dynamically changes in response to the changed data of the collaborative documents,
wherein the changed data of the collaborative documents is initiated by one of the first user, the second user, or a third user.

* * * * *